United States Patent [19]

Kine

[11] 4,325,467
[45] Apr. 20, 1982

[54] BICYCLE WHICH FACILITATES WHEEL REMOVAL

[75] Inventor: Masayoshi Kine, Osaka, Japan

[73] Assignee: Shimano Industrial Company Limited, Osaka, Japan

[21] Appl. No.: 203,472

[22] Filed: Nov. 3, 1980

Related U.S. Application Data

[63] Continuation of Ser. No. 7,706, Jan. 30, 1979, abandoned.

[30] Foreign Application Priority Data

Feb. 27, 1978 [JP] Japan .................................. 53-25551

[51] Int. Cl.³ .............................................. B62L 1/12
[52] U.S. Cl. .............................. 188/24.12; 188/24.19; 411/516
[58] Field of Search ............... 188/24.11, 24.12, 24.19, 188/24.22; 24/217 W, 218; 403/327, 328, 330, 355, 375; 411/347, 349, 516, 530

[56] References Cited

U.S. PATENT DOCUMENTS

| 2,313,249 | 3/1943 | Lum ..................................... 411/516 |
| 2,576,298 | 11/1951 | Kessler .............................. 411/516 |
| 3,829,826 | 8/1974 | Brown et al. ......................... 24/218 |
| 4,014,408 | 3/1977 | Armstrong ....................... 188/24.12 |

FOREIGN PATENT DOCUMENTS

| 1113873 | 4/1956 | France ............................... 188/24.19 |
| 1310213 | 10/1962 | France .................................. 411/530 |
| 239473 | 10/1945 | Switzerland ..................... 188/24.19 |
| 284980 | 8/1952 | Switzerland ..................... 188/24.19 |

Primary Examiner—Edward R. Kazenske
Attorney, Agent, or Firm—Stevens, Davis, Miller & Mosher

[57] ABSTRACT

In a caliper brake for a bicycle, a shaft member extending through a brake arm is provided either on a fixture securing an end of an operating wire to a first brake arm or on a support provided on a second brake arm for an outer pipe guiding the operating wire. The shaft member is detachably mounted on the brake arm and includes a portion projecting from the brake arm which portion is provided with a groove. A wire retaining member is provided with a pivotal portion and an engaging portion, the pivotal portion being pivotally attached to the brake arm and the engaging portion engaging with the groove.

5 Claims, 9 Drawing Figures

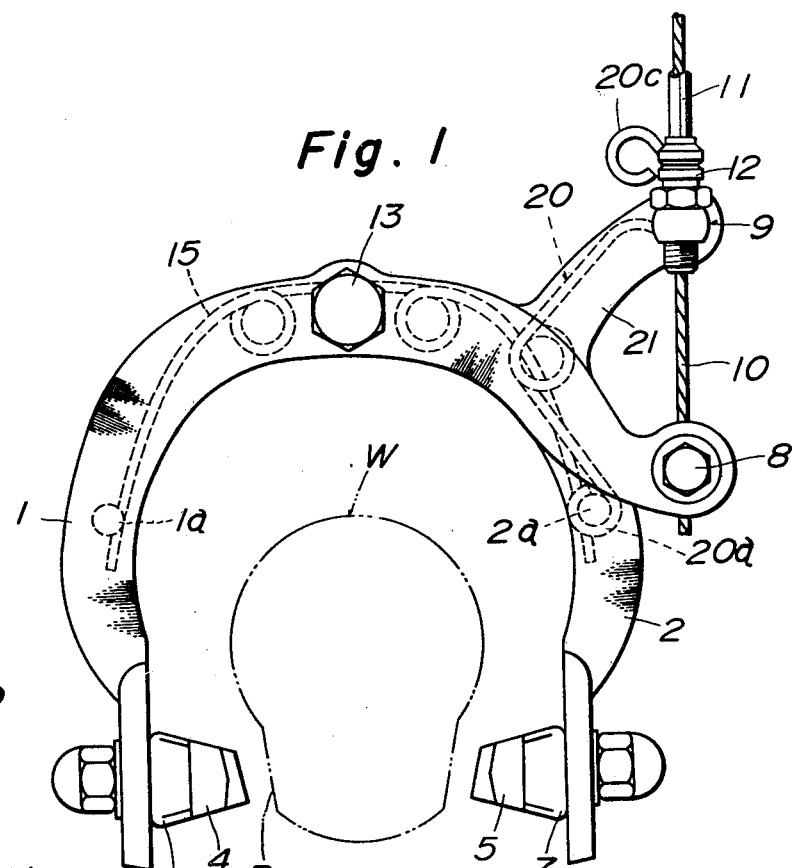
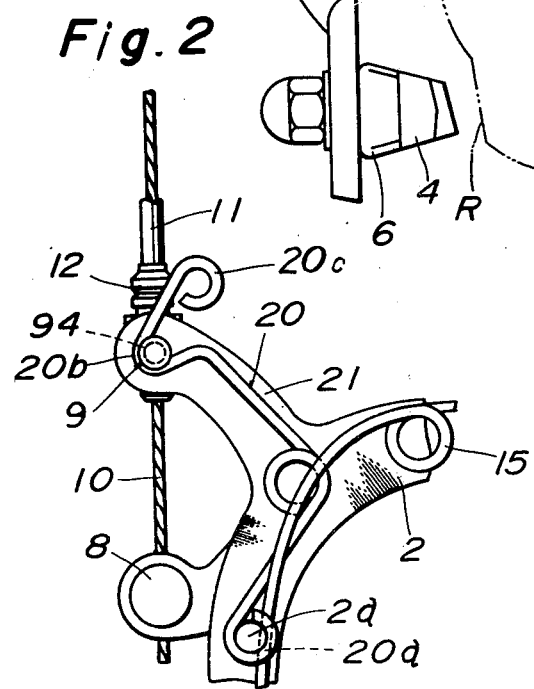
Fig. 1
Fig. 2

BICYCLE WHICH FACILITATES WHEEL REMOVAL

This is a continuation of application Ser. No. 007,706 filed Jan. 30, 1979, now abandoned.

BACKGROUND AND SUMMARY OF THE INVENTION

This invention relates to a caliper brake for use in a bicycle or like vehicles.

Generally, a caliper brake is composed of first and second brake arms, a pivotal shaft for rotatably supporting the brake arms, a pair of brake shoes supported by the brake arms and a return spring. The first brake arm has a wire fixture mounted thereon which secures an end of an operating wire, while the second brake arm has an outer pipe support means mounted thereon which guides the operating wire. An operating lever, connected to another end of the operating wire, is provided on a handle bar, which, when operated, causes the brake arms to oscillate around a pivotal shaft bringing the brake shoes into contact against a wheel rim to brake the wheel.

When a bicycle is transported, the wheels are often disassembled from the bicycle frame, and later reassembled thereon. Old wheels may also be removed and replaced by new ones. In either case, the space between the brake shoes must be increased before the wheel can be removed or remounted.

In order to increase the distance between the brake shoes, one must loosen the operating wire extending between the brake arms and operating lever. For this purpose, a so-called quick-release mechanism is known in which the support means for an outer pipe guiding the operating wire is made movable with respect to the brake arm with the support means being moved by the lever.

With this mechanism, the support means for the outer pipe can be quickly moved through the operation of the lever to spread the space between the brake shoes. However, this system is of complex construction and is relatively expensive. It also suffers from the disadvantage that the pace between the brake shoes is not intended to spread to a maximum. Considering safety when the quick-releasing mechanism has failed, the space between the brake shoes is adapted to be spread to a lesser extent than the maximum possible. The limited spread between brake shoes achievable by this mechanism is particularly a problem with bicycles designed for racing across remote places among mountains, as they use thicker tires than those normally used in roadster, tourist, or sports type bicycles. The thicker tires cannot fit between the limited spread of the brake shoes and the wheels cannot be quickly released.

To accommodate the larger tires, the space between the brake shoes must be spread to a maximum. However, as described above, the conventional quick-releasing system is incapable of spreading the space between the brake shoes to a maximum. Accordingly, when large size tires are used for road racing, either the brake shoes must be removed or the operating wire must be removed from its fixture to replace the wheel.

This invention is designed to overcome the disadvantages described. Thus, an object of this invention is to provide a caliper brake wherein wheels mounted with normal tires and wheels for racing mounted with thicker tires can both be quickly and easily replaced. A further object of the invention is to provide a mechanism for spreading the space between the brake shoes which is inexpensive and which has component parts which cannot get lost.

These objects are accomplished by a brake shoe spreading mechanism comprising a shaft member which extends through a brake arm provided either on a fixture securing an end of an operating wire which is mounted on one of the brake arms or on a support means for an outer pipe guiding the operating wire which is mounted on the other brake arm. In either case, the shaft member is detachably mounted on its associated brake arm and projects through a bore therein with the projecting portion being provided with a groove. A retaining member, composed mainly of a wire material, is provided with a pivotal portion and an engaging portion. The pivotal portion is pivotally attached to the brake arm to which the shaft member is mounted to elastically engage the engaging portion with the groove. With this mechanism, even wheels mounting thicker tires can be quickly and easily replaced on the bicycle frame. Thus, a mechanism for spreading the space between the brake shoes can be formed inexpensively, and the parts can be prevented from being lost.

These and other objects and features of the invention will be apparent from the following detailed description which is taken in conjunction with the accompanying drawings.

BRIEF DESCRIPTION OF THE DRAWINGS

FIG. 1 is a front view of a caliper brake in an embodiment of the invention,

FIG. 2 is a partial rear view of the FIG. 1 embodiment,

DETAILED DESCRIPTION OF THE INVENTION

Figure 3:
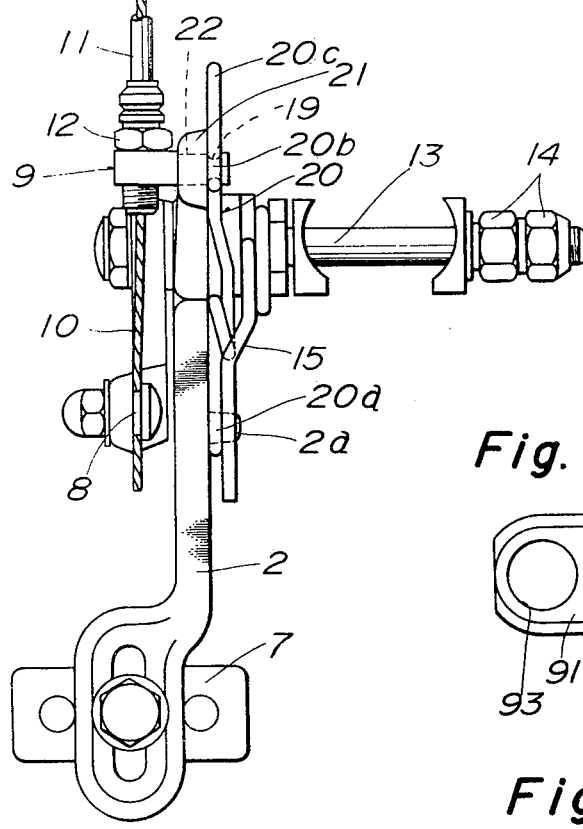
FIG. 3 is a side view of the FIG. 1 embodiment.

Referring to the drawings, reference numeral 1 denotes a C-shaped brake arm and reference numeral 2 denotes a Y-shaped brake arm. Brake shoes 4 and 5 each having a braking face opposite to the wheel rim R are respectively mounted, through holders 6 and 7, on first end portions of brake arms 1 and 2. A wire fixture 8 is mounted on a second end portion opposite to the first end portion of the first brake arm. The wire fixture secures one end of an operating wire 10 to a brake arm while the other end of operating wire 10 is secured to a brake lever (not shown) mounted on a handle bar (not shown). A support means 12 for an outer pipe 11 which guides the wire 10 passes through the shaft member 9 (to be described later) which is mounted in a throughhole 22 provided in the front end of a branch portion 21 forked from the middle portion of the second brake arm 2. A pivot shaft 13 slidably supports the brake arms 1 and 2 and is extended through a shaft hole provided in the middle portion of the first brake arm 1 and a shaft hole provided in the second end portion, opposite to the first end portion, of the second brake arm 2. Thus, the brake arms 1 and 2 are slidably supported respectively around the pivot shaft 13. As shown in FIG. 3, the pivot shaft 13 extends externally from the rear face of the brake arms 1 and 2. The extended portion, which extends through the frame (not shown) of the bicycle, is adapted to be secured to the frame by tightening a double nut 14. Reference numeral 15 designates a return spring which is supported between the brake arms 1 and 2 to act in the direction of spreading the space between the opposite braking faces of the brake shoes 4 and 5. The middle portion of the return spring is supported by the pivot shaft 13, one end of the return spring being engaged with the engaging groove in the engaging piece 1a which is projected from the rear face of the brake arm 1, the other end of the return spring being engaged with the engaging groove in the engagement piece 2a projected from the rear face of the brake arm 2.

Figure 5:
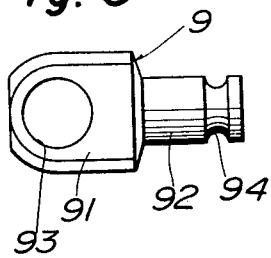
FIG. 5 is a plan view of a shaft member.
Figure 6:
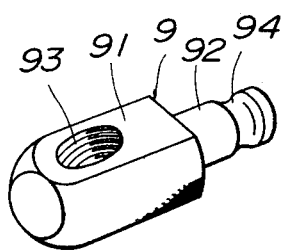
FIG. 6 is a perspective view of the shaft member.

The shaft member 9, which extends through a through-hole 22 provided in the branch portion 21 of the brake arm 2, is composed of a support portion 91 for supporting a support means 12 of the outer pipe 11 and a shaft portion 92 smaller in diameter than the through-hole 22, as shown in FIGS. 5 and 6. The support portion 91 has a flat face and has a screw hole 93 extending through the support portion in a direction normal to the flat face. The shaft portion 92 is longer than the thickness of the branch portion 21 of the brake arm 2. When the shaft portion 92 engages into the through-hole 22, the tip end portion of the shaft portion projects from the branch portion 21. The projected portion has a ring-shaped groove 94 formed therein. Groove 94 need not always be ring-shaped and it may be provided in radial direction, instead of in a peripheral face of the projecting portion of shaft member 9. Also, the shaft member 9 may be formed separately from or integrally with the support means.

The shaft member 9 has the shaft portion 92 detachably engaged into the through-hole 22, and retained in the through-hole by the retaining member 20 engaging with groove 94. The support means 12 of the outer pipe is engaged into the screw hole 93 of the support portion 91.

Figure 4:
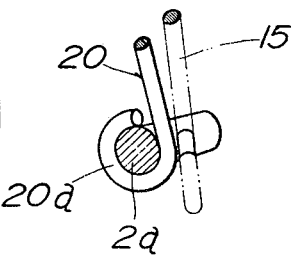
FIG. 4 is an enlarged view of a retaining member pivotal portion.
Figure 7:
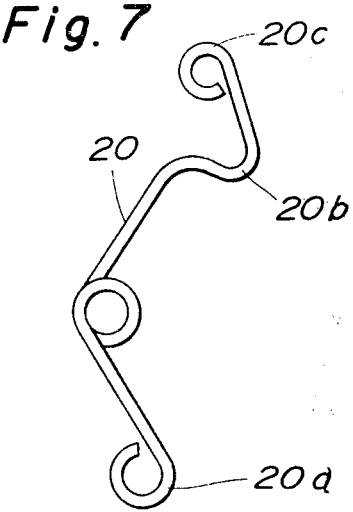
FIG. 7 is a front view of a retaining member.

As shown in FIG. 7, the retaining member 20 is composed of an elastic wire material. The wire material is coiled at its middle portion and is curved, at its one end, into a circle to form a ring-shaped pivotal portion 20a and at its other end, into a semicircle shape to form an engaging portion 20b. The loose end of the engaging portion 20b is extended to provide a ring-shaped engaging area 20c at its extended end. The engaging portion 20b is elastically engaged into the groove 94 of the shaft member 9 to prevent the shaft member 9 from coming out of the through-hole 22. The pivotal portion 20a is pivotally engaged with the base portion of the engagement piece 2a projected from the second brake arm 2. The pivotal portion 20a is prevented from coming off from the engagement piece 2a by the return spring 15, which is engaged into the engaging groove of the engagement piece 2a (FIG. 4).

As shown in FIG. 1, in usual operation, the engaging portion 20b of the retaining member 20 is engaged into the groove 94 of the shaft member 9. The shaft member is thus prevented from disengaging from the through-hole 22 in the branch portion 21 of the brake arm 2. The shaft member 9 maintains a constant space between the brake shoes 4, 5, which are mounted on the brake arms 1 and 2, and the wheel rim R. Normal braking occurs when the brake lever (not shown) is operated thus pulling operating wire 10.

Figure 8:
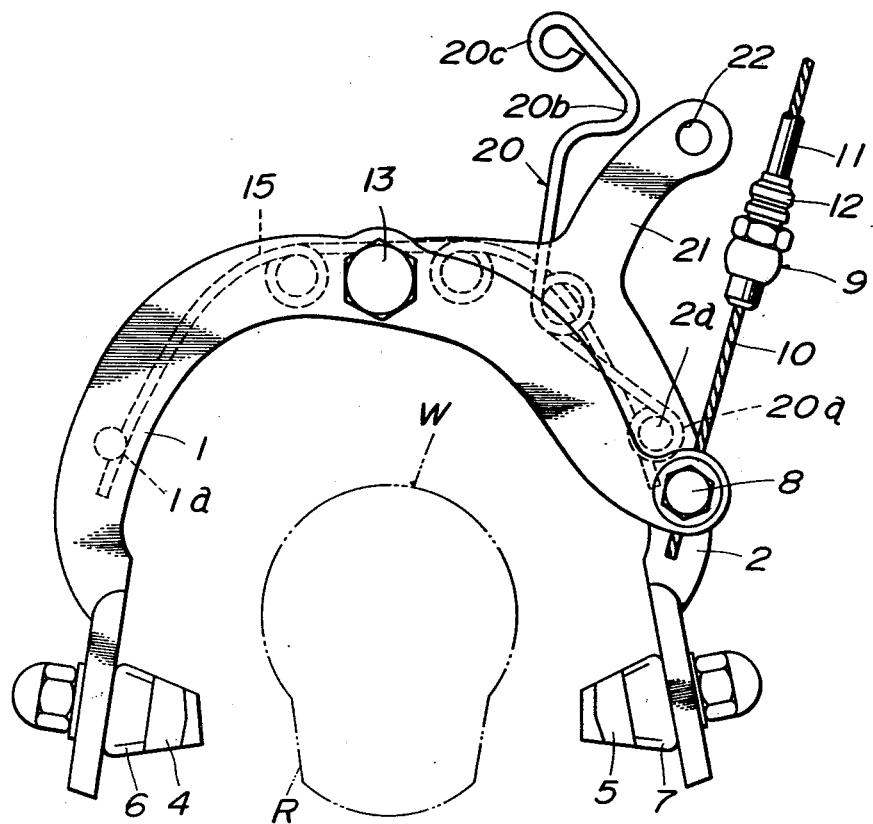
FIG. 8 is a view illustrating a fully spread condition of the brake shoe when an old wheel is replaced by a new one, and, FIG. 9 is a perspective view of the shaft member using a square cross sectional shaped retaining member.

When a wheel W is replaced, the engaging portion 20b side of the retaining member 20 is depressed by manipulation of end portion 20c in a direction of compression to disengage the engaging portion 20b from the groove 94 of the shaft member 9. The shaft member 9 is now removed from the through-hole 22 in the brake arm 2 causing the braking mechanism to assume the state shown in FIG. 8. Because of the disengagement of the shaft member 9 from branch portion 21, the brake arms 1 and 2 now spread, at their ends, about the pivot shaft 13 due to the action of return spring 15. As shown in FIG. 8, this causes the space between the brake shoes 4 and 5 to reach a maximum value allowing the wheel W to be easily disengaged from between brake shoes 4 and 5, even if the wheel carries a thick tire.

To replace the wheel W, the brake arms 1 and 2 are manually rotated against the elastic force of the return spring 15 causing a reduction in the space between the brake shoes 4 and 5. In other words, the space between the fixture 8 of the brake arm 1 of the through-hole 22 in the branch portion 21 supporting the shaft member 9 is reduced allowing for insertion of shaft portion 92 of the shaft member 9 into the through-hole 22 of the branch portion 21. After insertion of the shaft portion of shaft member 9 into the through-hole 22, the engaging portion 20b of the retaining member 20 is elastically engaged with the groove 94 of the shaft member 9.

In the above described embodiment, the shaft member 9 was provided on the support means 12 side of the brake mechanism. However, the shaft member 9 may alternatively be provided on the fixture 8 side in the same manner with the retaining member 20 elastically engaging with the groove 94 of the shaft member 9.

Figure 9:
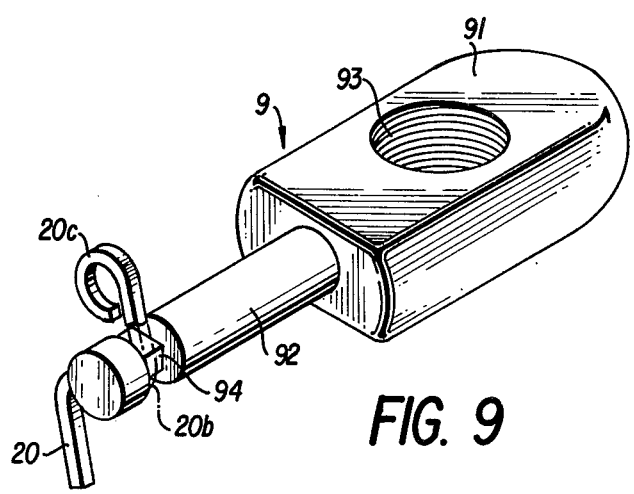

The retaining member 20 may be composed of an elastic wire having a circular or square cross section. When the cross section of the elastic wire is circular, the cross section of groove 94 in the shaft protion 92 of the shaft member 9 is semicircular. When the section of the elastic wire is square (FIG. 9), the cross section of groove 94 in the shaft portion 92 of the shaft member 9 is square.

According to this invention as described hereinabove, the space between the brake shoes can be spread to maximum, through the extremely simple operation of disengaging the shaft member from the through-hole of the brake arm, by manipulating a retaining member elastically engaged into the groove of the shaft member. This allows a quick and easy replacement of the wheel W no matter what size tire is used.

Since the invention only requires a shaft member provided on either the fixture of the operating wire or on the support means for the outer pipe guiding the wire, and a retaining member elastically engaging with a groove of the shaft member, it is easier to manufacture and less expensive than a conventional quick release system, using, for example, a cam member. Moreover, since the retaining member is made of a wire material provided with a pivotal portion and an engaging portion, with the pivotal portion being pivotally attached to the brake arm, and the engaging portion elastically engaged into the groove in the shaft member, there is no possibility for losing the retaining member even during the wheel replacing operation. Furthermore, the engaging and disengaging operations of the engaging portion can be effected simply by manually rotating the engaging portion around the pivotal portion thereby easily effecting wheel replacement. Since the retaining member pivotally engages with the engagement piece of the return spring, there is no need for a separate pivotal member, thus simplifying the construction and reducing the cost of the retaining member.

Also, since the positions for securing the operating wire to the brake mechanism remain unchanged, the space between the brake shoes and the wheel rim remain constant under normal operating conditions.

As many apparently widely different embodiments of this invention may be made without departing from the spirit and scope thereof, it is to be understood that the invention is not limited to the specific embodiment described, but only by the scope of the appended claims.

What is claimed is:

1. A caliper brake comprising:
   a pair of first and second brake arms;
   a pivot shaft for oscillably supporting said brake arms;
   a pair of brake shoes respectively supported by said brake arms, said brake shoes having their braking faces disposed facing one another;
   a return spring biasing the braking faces of said brake shoes apart;
   a wire fixture for securing one end of a brake operating wire mounted on said first brake arm;
   a suport means for an outer pipe guiding said wire mounted on said second brake arm;
   a shaft member provided on said support means extending through said second brake arm and detachably mounted on said second brake arm, said shaft member including a shaft portion projecting through a bore in said second brake arm and being provided with a groove on at least a portion of its outer periphery;
   a retaining member having a pivotal portion and a bent engaging portion, said retaining member being provided on the brake arm through which said shaft member extends, said pivotal portion and bent engaging portion being disposed in the same plane and in series, said retaining member being pivotally supported by said pivotal portion on said caliper brake and the bent engaging portion of the retaining member being elastically engaged into the groove of said shaft member to prevent said shaft member from being drawn out from said bore, said retaining member comprising an elastic wire curved at its one longitudinal end into a circular shape to provide said pivotal portion and curved at its other longitudinal end into a semicircular shape to provide said bent engaging portion, said bent engaging portion extending at its free end to form a manually manipulatable operation portion, and a connecting portion connecting said pivotal portion and bent engaging portion, said connecting portion having a bend therein such that said bent connecting portion biases the bent engaging portion radially toward and into engagement with said shaft member, said manually manipulatable portion allowing the gripping of said retaining member to bend said retaining member against the biasing of said engaging portion toward said shaft to allow said shaft to be removed from said second brake arm bore.

2. The caliper brake according to claim 1, wherein said retaining member comprises an elastic wire having a circular cross section shape, said shaft member groove with which the engaging portion of said retaining member is engaged being semicircular in shape.

3. The caliper brake according to claim 1, wherein said retaining member comprises an elastic wire having a square cross sectional shape, said shaft member groove with which the engaging portion of said retaining member is engaged being square in shape.

4. The caliper brake according to claim 1, wherein said retaining member is pivotally attached to said second arm.

5. The caliper brake according to claim 4, wherein said retaining member is pivotally attached to an engagement piece provided for engaging said return spring with said second brake arm.

* * * * *